(12) United States Patent
Megli et al.

(10) Patent No.: US 7,748,355 B2
(45) Date of Patent: Jul. 6, 2010

(54) APPROACH FOR FACILITATING ENGINE MODE TRANSITIONS

(75) Inventors: Thomas Megli, Dearborn, MI (US); Nate Trask, Dearborn, MI (US); Donald J. Lewis, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 920 days.

(21) Appl. No.: 11/532,447

(22) Filed: Sep. 15, 2006

(65) Prior Publication Data

US 2008/0066713 A1 Mar. 20, 2008

(51) Int. Cl.
F02D 13/00 (2006.01)

(52) U.S. Cl. ............................... 123/90.15

(58) Field of Classification Search ............ 123/347, 123/90.11, 90.15, 568.14
See application file for complete search history.

(56) References Cited

U.S. PATENT DOCUMENTS

| | | | |
|---|---|---|---|
| 6,237,562 B1 | 5/2001 | Awasaka et al. | |
| 6,293,246 B1 | 9/2001 | Tanahashi et al. | |
| 6,336,436 B1 | 1/2002 | Miyakubo et al. | |
| 6,386,177 B2 * | 5/2002 | Urushihara et al. | 123/299 |
| 6,612,294 B2 | 9/2003 | Hiraya et al. | |
| 6,622,689 B2 * | 9/2003 | Hasegawa et al. | 123/294 |
| 6,640,771 B2 * | 11/2003 | Fuerhapter | 123/295 |
| 7,194,996 B2 * | 3/2007 | Koopmans | 123/295 |
| 7,275,514 B2 * | 10/2007 | Kuo et al. | 123/299 |
| 7,370,616 B2 * | 5/2008 | Kuo et al. | 123/90.15 |
| 2004/0134449 A1 * | 7/2004 | Yang | 123/27 R |
| 2004/0182359 A1 * | 9/2004 | Stewart et al. | 123/295 |
| 2006/0196467 A1 * | 9/2006 | Kang et al. | 123/305 |
| 2006/0196468 A1 * | 9/2006 | Chang et al. | 123/305 |
| 2006/0196469 A1 * | 9/2006 | Kuo et al. | 123/305 |
| 2006/0243241 A1 * | 11/2006 | Kuo et al. | 123/295 |

FOREIGN PATENT DOCUMENTS

JP        2008-69785        *   3/2008

* cited by examiner

*Primary Examiner*—Hai H Huynh
(74) *Attorney, Agent, or Firm*—Allan J. Lippa; Alleman Hall McCoy Russell & Tuttle LLP

(57) ABSTRACT

A method of transitioning a cylinder of an engine from a spark ignition mode to a homogeneous charge compression ignition mode, the cylinder having at least one electrically actuated intake valve and at least one exhaust valve, the method comprising of before a transition, operating the cylinder with at least some overlap between an opening event of the intake valve and an opening event of the exhaust valve in the spark ignition mode; in response to a transition request, operating the cylinder with at least some negative overlap between an opening event of the intake valve and an opening event of the exhaust valve, retarding the intake valve opening and closing timing by different amounts and retarding ignition timing; and further increasing negative overlap and performing the homogeneous charge compression ignition mode.

20 Claims, 4 Drawing Sheets

APPROACH FOR FACILITATING ENGINE MODE TRANSITIONS

BACKGROUND AND SUMMARY

Vehicles having an internal combustion engine may be operated across a range of conditions over a drive cycle. As such, an engine may be configured to vary operation between one or more modes based on operating conditions to achieve various benefits of each mode of operation. For example, an engine may be configured to operate in a homogeneous charge compression ignition (HCCI) mode (i.e. a controlled autoignition or CAI mode) during some conditions in order to achieve improved fuel efficiency and/or reduced emissions as compared to a spark ignition (SI) mode. However, during some conditions, where it may be difficult to achieve reliable combustion in the HCCI mode, the SI mode may be selectively employed. In this manner, an engine may be configured to respond to operating conditions by selectively transitioning between SI mode and HCCI mode.

However, during some conditions, transitions between SI mode and HCCI mode may be difficult to achieve. For example, SI mode may utilize an initial charge of air and fuel at approximately ambient temperature, whereas HCCI mode may utilize an initial charge having a substantially higher temperature. The difference in operating conditions of these two modes may create undesirable discontinuities during transitions, such as torque disturbances, noise and vibration harshness (NVH), misfire, pre-ignition, and/or knock. Therefore, various control strategies have been aimed at improving the transition between these two modes of operation.

In one approach, as described in U.S. Pat. No. 6,336,436, combustion changeover between spark ignition combustion of a homogeneous mixture to compression autoignition combustion is achieved via an intermediate stratified lean spark ignition mode by varying the timings of intake and exhaust valves.

The inventors herein have recognized some disadvantages with this approach. Specifically, in the above approach, an intermediate stratified charge combustion mode is used to facilitate transitions between the homogeneous SI mode and the HCCI mode, which may result in a longer transition period, potential torque disturbances, and/or reduced efficiency, at least under some conditions. Further, the intake and exhaust valve timings are varied by mechanical valve actuation, which may limit how the intake and exhaust valve timings may be varied in response to the transition, thereby limiting other aspects of engine control, such as spark timing, for example.

A method of transitioning a cylinder of an engine from a spark ignition mode to a homogeneous charge compression ignition mode, comprising: before a transition, operating the cylinder with at least some overlap between an opening event of an intake valve and a closing event of an exhaust valve in the spark ignition mode; in response to a transition request, operating the cylinder with at least some negative overlap between an opening event of the intake valve and a closing event of the exhaust valve, retarding an opening timing and a closing timing of the intake valve, the opening timing retarded a different amount than the closing timing and retarding ignition timing; and further increasing negative overlap and performing the homogeneous charge compression ignition mode.

By utilizing such operation, transitions between homogeneous SI and HCCI modes may improved without requiring an intermediate stratified mode, although such an intermediate mode may be used, if desired.

DETAILED DESCRIPTION

Engine combustion mode transitions may utilize various adjustments in valve timing and/or ignition timing. As described further, in one example approach, valve timing adjustments which vary the valve overlap and/or relative intake and exhaust valve durations and timing during a transition in operating modes may be used to improve the transition. Further, spark timing adjustments that are coordinated with the above valve timing adjustments may be used to further improve the transition.

Specifically, such operation may be used during a transition from SI mode to HCCI to reduce knock and/or torque fluctuations as operating conditions are adjusted in anticipation of HCCI mode operation. For example, the temperature of the initial charge (i.e. initial mixture of air and/or fuel) may be increased during the transition by intake air heating and/or increased EGR, etc., thereby increasing the potential for knock. As such, the spark timing may be retarded (e.g. spark timing may be adjusted to occur later after TDC of the power stroke) to reduce the occurrence and/or severity of knock and/or the amount of torque produced by the engine. Further, retarded spark timing may be used to heat the cylinders prior to initiating HCCI. As one example, by retarding the spark timing, the exhausted gas temperature may be increased, which may be reintroduced into the cylinder as high temperature EGR, thereby promoting HCCI.

However, the amount of spark timing retard may be limited during some conditions, thereby limiting the amount of control that may be performed during the transition. Thus, in another approach variable intake valve timing may be used to cause the intake valve opening to occur later in the cycle(s) (e.g. after TDC of the intake stroke) during a transition. This late intake valve opening may be used to enable greater spark retard, thereby increasing the amount of control available during the transition. In this manner, the robustness and repeatability of the transition may be increased while decreasing the occurrence of discontinuities caused by the transition.

Figure 1:
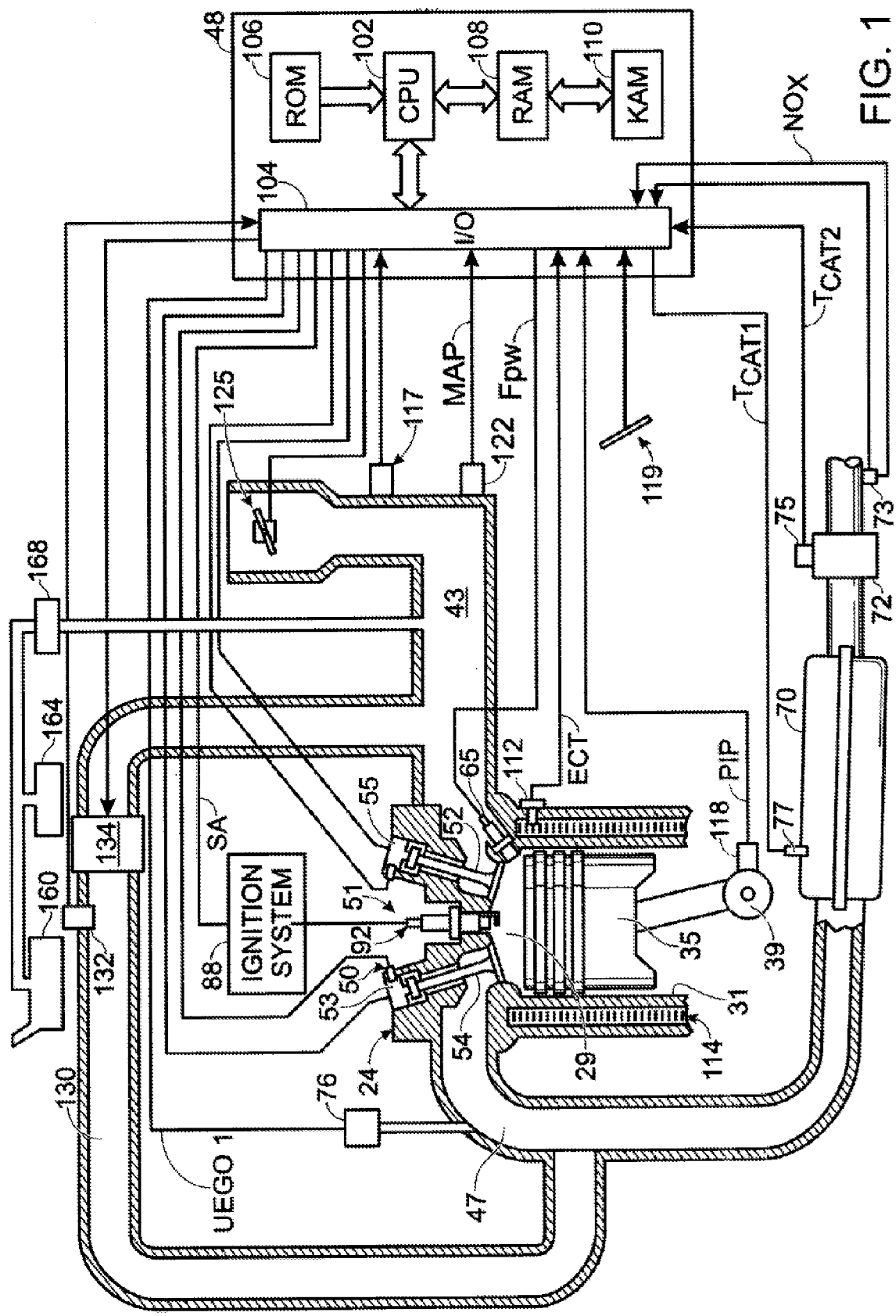
FIG. 1 shows one cylinder of an example engine for a vehicle.

Referring now specifically to FIG. 1, it shows an example internal combustion engine 24 for a vehicle, which is capable of operating in a spark ignition mode and a compression ignition mode. One cylinder or combustion chamber 29 of multi-cylinder engine 24 is shown controlled by a control system including electronic engine controller 48. Combustion chamber 29 includes cylinder walls 31 with a piston 35 positioned therein and connected to crankshaft 39. Combustion chamber 29 is shown communicating with intake manifold 43 and exhaust manifold 47 via respective intake valve 52 and exhaust valve 54. While only one intake and one exhaust valve are shown, the engine may be configured with a plurality of intake and/or exhaust valves.

Engine 24 is further shown configured with an exhaust gas recirculation (EGR) system for supplying exhaust gas to intake manifold 43 from exhaust manifold 47 via EGR passage 130. The amount of exhaust gas supplied by the EGR system can be controlled by EGR valve 134 communicatively coupled to controller 48. Further, the exhaust gas within EGR passage 130 may be monitored by an EGR sensor 132, which can be configured to measure temperature, pressure, gas concentration, etc. Under some conditions, the EGR system may be used to regulate the temperature of the air and fuel mixture within the combustion chamber, thus providing a method of controlling the timing of autoignition for some compression ignition combustion modes such as homogeneous charge compression ignition (HCCI) mode.

In some embodiments, as shown in FIG. 1, variable valve timing may be provided to the exhaust and/or intake valves by electrically actuated valves (EVA) 53 and 55, respectively. However, in some embodiments, mechanical valve actuation via cam profile switching (CPS), variable valve timing (VVT), variable cam timing (VCT), and variable valve lift (VVL) system may be used to control valve operation. Exhaust and intake valve position feedback can be provided via comparison of signals from respective sensors 50 and 51. In some embodiments, cam actuated exhaust valves may be used with electrically actuated intake valves, if desired or vice-versa. In addition, intake manifold 43 is shown communicating with optional electronic throttle 125.

Engine 24 is also shown having fuel injector 65 coupled thereto for delivering liquid fuel in proportion to the pulse width of signal Fpw from controller 48 directly to combustion chamber 29. As shown, the engine may be configured such that the fuel is injected directly into the engine cylinder, which is known to those skilled in the art as direct injection. Distributorless ignition system 88 provides ignition spark to combustion chamber 29 via spark plug 92 in response to signal SA from controller 48. Universal Exhaust Gas Oxygen (UEGO) sensor 76 is shown coupled to exhaust manifold 47 upstream of catalytic converter 70. The signal from sensor 76 can be used to advantage during feedback air/fuel control to maintain average air/fuel at stoichiometry during a stoichiometric homogeneous mode of operation, for example.

Controller 48 is shown in FIG. 1 as a microcomputer including: microprocessor unit 102, input/output ports 104, and read-only memory 106, random access memory 108, keep alive memory 110, and a data bus. Controller 48 is shown receiving various signals from sensors coupled to engine 24, in addition to those signals previously discussed, including: engine coolant temperature (ECT) from temperature sensor 112 coupled to cooling sleeve 114; a pedal position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor from a Hall effect sensor 118 sensing crankshaft 39 position. In some embodiments, the requested torque can be determined by pedal position, vehicle speed, and/or engine operating conditions, etc. In one aspect of the present description, engine position sensor 118 produces a predetermined number of equally spaced pulses every revolution of the crankshaft from which engine speed (RPM) can be determined.

FIG. 1 shows engine 24 configured with an aftertreatment system comprising a catalytic converter 70 and a lean NOx trap 72. In this particular example, temperature Tcat1 of catalytic converter 70 is measured by temperature sensor 77 and temperature Tcat2 of lean NOx trap 72 is measured by temperature sensor 75. Further, gas sensor 73 is shown arranged in exhaust passage 47 downstream of lean NOx trap 72, wherein gas sensor 73 can be configured to measure the concentration of NOx and/or $O_2$ in the exhaust gas. Lean NOx trap 72 may include a three-way catalyst that is configured to adsorb NOx when engine 24 is operating lean of stoichiometry. The adsorbed NOx can be subsequently reacted with HC and CO and catalyzed when controller 48 causes engine 24 to operate in either a rich homogeneous mode or a near stoichiometric homogeneous mode. Such operation can occur during a NOx purge cycle when it is desired to purge stored NOx from the lean NOx trap, or during a vapor purge cycle to recover fuel vapors from fuel tank 160 and fuel vapor storage canister 164 via purge control valve 168, or during operating modes requiring more engine power, or during operation modes regulating temperature of the emission control devices such as catalyst 70 or lean NOx trap 72. It will be understood that various different types and configurations of emission control devices and purging systems may be employed.

As will be described in more detail below, combustion in engine 24 can be of various types, depending on a variety of conditions. In one example, a spark ignition (SI) mode may be performed where the engine utilizes a sparking device to combust a mixture of air and fuel within combustion chamber 29. In another example, a homogeneous charge compression ignition (HCCI) mode may be used where a substantially homogeneous air and fuel mixture is compressed within combustion chamber 29 by piston 35 until the mixture attains an autoignition temperature and combusts without requiring a spark from a sparking device. However, it should be appreciated that a spark may be used during HCCI mode to initiate autoignition of the mixture, for example, after the desired autoignition timing to reduce the occurrence of misfire. In yet another example, the engine may operate in a compression ignition mode that is not necessarily homogeneous. It should be appreciated that the examples disclosed herein are non-limiting examples of the many possible combustion modes that may be used with engine 24.

During HCCI mode, the air/fuel mixture may be highly diluted by air and/or residuals (e.g. lean of stoichiometry), which may result in lower combustion gas temperature. Thus, engine emissions may be substantially lower than SI combustion under some conditions. Further, fuel efficiency with autoignition of lean (or diluted) air/fuel mixture may be increased by reducing the engine pumping loss, increasing gas specific heat ratio, and by utilizing a higher compression ratio. During HCCI combustion, autoignition of the combustion chamber gas may be controlled so as to occur at a prescribed time so that a desired engine torque is produced. Since the temperature of the intake air entering the combustion chamber may be relevant to achieving the desired autoignition timing, operating in HCCI mode at high and/or low engine loads may be difficult.

During SI mode, the temperature of intake air entering the combustion chamber may be near the ambient air temperature and may therefore be substantially cooler than desired for achieving autoignition of an air and fuel mixture. Since a spark may not be used during some conditions to initiate combustion in HCCI mode, the temperature and/or pressure of the intake air may affect the timing of combustion via autoignition. Thus, SI mode may be utilized to achieve reliable combustion timing during some operating conditions where it may be difficult to achieve with HCCI mode, such as higher or lower engine loads, for example. However, HCCI mode may be used during select operating conditions such as at intermediate engine load and/or engine speed to produce decreased levels of emissions and/or greater fuel efficiency as compared to SI combustion.

Figure 2:
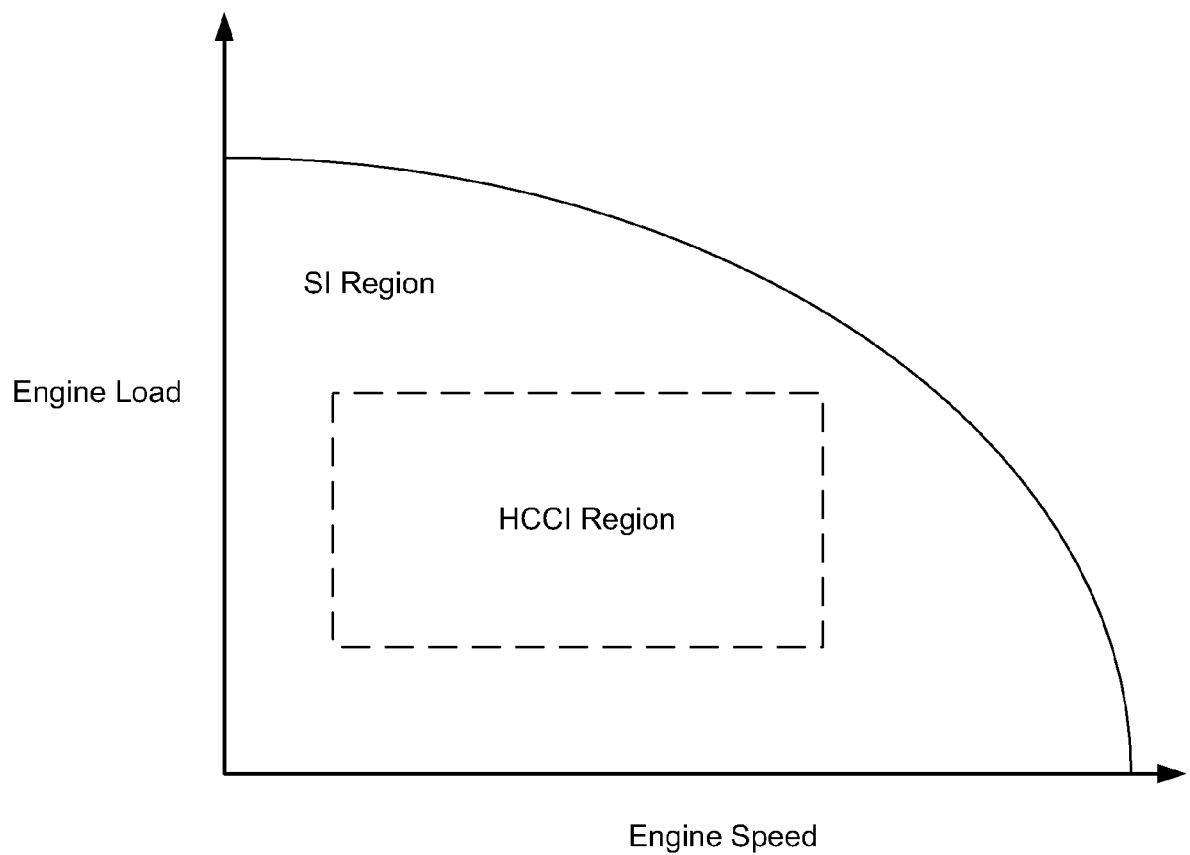
FIG. 2 shows a mode map for an example engine control strategy.

FIG. 2 shows a mode map for an example engine control strategy. The map of FIG. 2 shows engine load (or engine torque) on the vertical axis and engine speed on the horizontal axis. The SI mode operating region is shown bound by the vertical axis on the left hand side, the horizontal axis on the bottom, and the engine operating envelope. As described above, SI mode may be more robust than other compression ignition modes such as HCCI due to the use of spark initiated combustion. In this manner, SI mode may be used across a broad range of conditions within the engine operating envelope. An HCCI region represented generally by a rectangular region defined by a broken line is shown within the SI mode operating region. During some operating conditions, such as when the engine load and speed are within the HCCI mode operating region, engine 24 may operate in HCCI mode to achieve improved fuel economy and/or reduced emissions. During other operating conditions, for example, when the operating conditions are outside of the HCCI region, the engine may be operated in SI mode.

In this manner, an engine such as engine 24 may be controlled by the control system (e.g. controller 48) to transition between various modes of operation such as, for example, SI mode to HCCI mode or HCCI mode to SI. Further, these transitions may be performed by adjusting one or more operating conditions such as spark timing, intake and/or exhaust valve timing and/or lift, turbocharging, fuel injection timing and/or quantity, air/fuel ratio, intake air heating, EGR addition, throttle position, etc.

In some conditions, transitions from SI mode to HCCI mode may be difficult to achieve since the temperature of the intake air used during SI mode may be cooler than desired for one or more cycles after HCCI mode is initiated and/or an ignition spark is discontinued. If the operating conditions are not controlled during the transition, then misfire, knock, noise and vibration harshness (NVH), and/or torque fluctuations may occur, or the desired transition may not be achieved. Thus, the control strategy for performing a transition to or from a compression ignition mode (e.g. HCCI) utilizing autoignition may affect the repeatability and robustness of the transition.

In one approach, spark timing may be varied during a transition from SI mode to reduce knock and/or torque fluctuations as operating conditions are adjusted in anticipation of HCCI mode operation. For example, the temperature of the initial charge (i.e. initial mixture of air and/or fuel) may be increased during the transition by intake air heating, EGR, etc., thereby increasing the potential for knock. As such, the spark timing may be retarded (e.g. spark timing may be adjusted to occur later after TDC of the power stroke) to reduce the occurrence and/or severity of knock and/or the amount of torque produced by the engine.

However, the amount of spark timing retard may be limited during some conditions, thereby limiting the amount of control that may be performed during the transition. In another approach described herein with reference to FIGS. 3 and 4, fully variable intake valve timing via at least one electrically actuated valve may be used to cause the intake valve opening to occur later in the cycle(s) (e.g. after TDC of the intake stroke) during a transition. This late intake valve opening may be used to enable greater spark retard, thereby increasing the amount of control available during the transition. In this manner, the robustness and repeatability of the transition may be increased while decreasing the occurrence of discontinuities caused by the transition.

Figure 3:
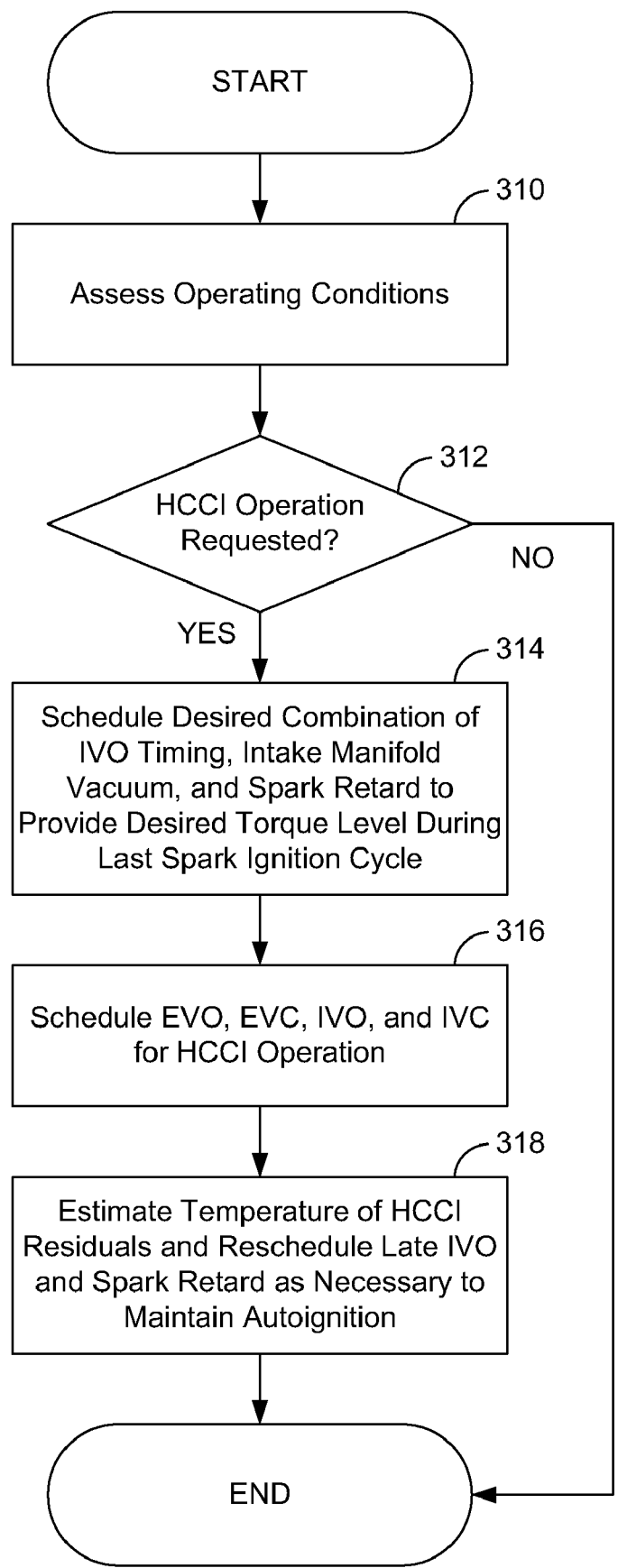
FIG. 3 shows an example control strategy for achieving a transition from SI mode to HCCI mode.

FIG. 3 shows an example control strategy for facilitating a transition from SI mode to HCCI mode. For example, beginning at 310, the operating conditions of the engine and/or vehicle may be assessed. In this example, the engine such as engine 24 described herein is initially operating in a spark ignition mode, however transitions from other modes to HCCI mode may be achieved using a similar strategy, under some conditions. At 312, it may be judged whether HCCI mode operation is requested. In at least one example, HCCI mode may be requested if the operating conditions assessed at 310 are within the HCCI operating region, for example, as shown in FIG. 2. If the answer at 312 is no, the routine may end, or may return to 310 for subsequent cycles.

Alternatively, if the answer at 312 is yes, the control system may schedule the desired combination of intake valve opening (IVO) timing, intake manifold vacuum via throttle position, and spark retard to provide the desired torque level during one or more of the last spark ignition cycles prior to the transition as shown at 314. For example, spark timing retard may be used to control the amount of torque produced by the engine so that torque fluctuations during the transition are reduced. In order to decrease torque, the spark timing retard may be retarded and to increase torque, the spark timing may be advanced.

Figure 4:
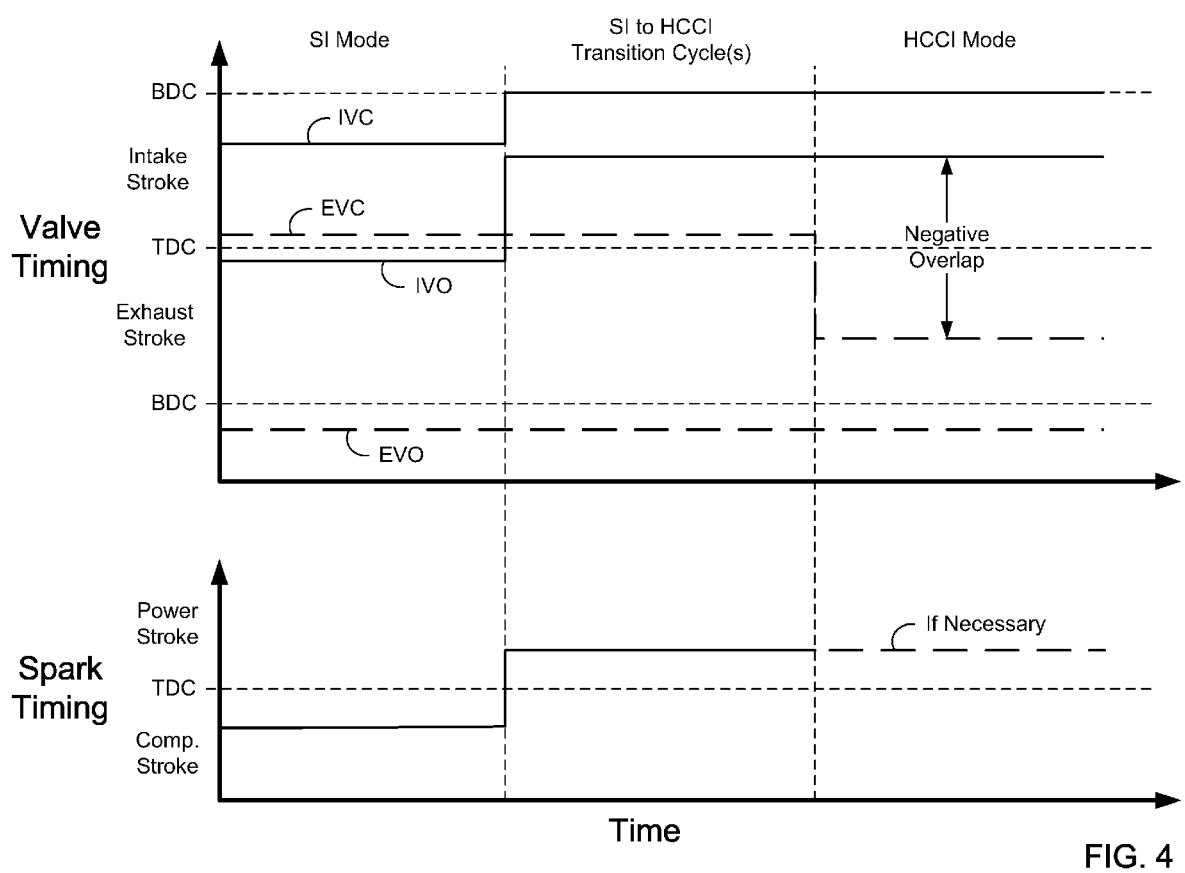
FIG. 4 shows a timing diagram for an example transition from SI mode to HCCI mode.

If one or more valves of the engine are controlled by EVA, then the timing of valve opening and closing events may be varied independent of each other. In one approach, as shown in FIG. 4 for example, a late IVO timing may be used to improve combustion stability, enabling a more aggressive or greater spark retard. In addition to late IVO timing, the intake valve closing (IVC) may be adjusted responsive to the IVO to occur later in the cycle so that a desired amount of air may be entrained into the cylinder. However, the IVO may be adjusted independent of IVC via EVA. The late IVO timing (e.g. well after TDC of the intake stroke) can be used to improve mixing and turbulence of the air and injected fuel due to the unrestrained expansion of gases through the intake valve(s) and into the cylinder. This expansion can also heat the intake charge by as much as 30%-40%, which may reduce the brake work and increase the exhaust temperature. The hotter exhaust gases may then be available in the following cycle or cycles to promote auto-ignition of the first and subsequent HCCI mode cycles via exhaust gas trapping and/or EGR, for example. In this manner, charge temperature may be controlled so that auto-ignition occurs at the desired timing.

At 316, the control system may schedule the timing for the exhaust valve opening (EVO), exhaust valve closing (EVC), IVO, and IVC as desired for the first and subsequent cycles after the transition where HCCI mode is performed. If the engine is configured with electrically actuated intake and exhaust valves then the timing of the valve opening and closing events may be varied as desired on a cycle to cycle basis. For example, the EVC before the first HCCI mode cycle may be advanced so that the negative valve overlap (e.g. concurrently closed timing) between the exhaust valve(s) and intake valve(s) is increased, as shown in FIG. 4, for example. The increased negative valve overlap may be used to increase the amount of residuals retained in the combustion chamber (e.g. exhaust gas trapping), which can serve to increase the temperature of the subsequent charge. In this manner, the amount of hot residuals retained within the cylinder may be controlled, thereby facilitating autoignition of the air and fuel mixture at the desired timing.

In some conditions, an assist spark or back-up spark may be scheduled and performed by the spark plug (e.g. a waste spark) at a time after auto-ignition of the fuel and air mixture is desired, to ensure combustion of the mixture. In some conditions, an assist spark may be performed at the desired timing of combustion to add the energy needed to initiate autoignition of the mixture, thereby achieving some of the benefits of HCCI mode (e.g. greater fuel efficiency and/or reduced emissions).

At 318, the control system may estimate the temperature of the residuals produced by HCCI mode combustion and reschedule the late IVO and/or spark retard as necessary to maintain the desired autoignition timing. For example, after one or more cycles of HCCI mode combustion (i.e. autoignition), the control system may advance the IVO and/or spark timing in response to the temperature of the residuals produced via the HCCI mode operation. As one example, if the temperature of the residuals are low (e.g. just after a transition to HCCI mode), autoignition may occur later than desired (or not at all) if corrective action is not taken such as increasing the initial charge temperature via retarding late IVO and/or spark timing. As another example, if the temperature of the residuals are high (e.g. one or more cycles after a transition to HCCI mode), autoignition may occur earlier than desired (potentially resulting in preignition and/or knock) if corrective action is not taken such as decreasing the initial charge temperature by advancing the late IVO and/or spark timing retard. In this manner, the timing of auto-ignition may be controlled. Finally, the routine may end or may return to 310 for subsequent cycles.

It should be appreciated that other control operations may be performed before, after, and/or during the approach described herein with reference to FIG. 3. For example, throttle position and/or boost provided by a turbocharger may be varied during the transition to control intake manifold pressure. Further, intake air heating and/or EGR may be increased just before a transition to HCCI and/or during HCCI mode to facilitate autoignition.

Similarly, transitions from SI mode to HCCI mode may generally be achieved by decreasing the initial charge temperature (e.g. by varying exhaust valve timing to reduce exhaust gas trapping and/or EGR) while varying spark timing to maintain the desired torque.

FIG. 4 shows a timing diagram for an example transition from SI mode to HCCI mode. Valve timing events are shown on the upper portion of the timing diagram including the EVO, EVC, IVO, and IVC, and the spark timing events are shown on the lower portion of the timing diagram. During SI mode operation, the EVO may occur in this example timing diagram before BDC of the exhaust stroke and EVC may occur after TDC. During SI mode operation, the IVO may occur before TDC and the IVC may occur before BDC of the intake stroke. In this manner, the intake and exhaust valves may be controlled during SI operation to have at least some valve overlap. Spark timing is shown on the lower graph to occur before TDC of the power stroke, however, other spark timings are possible (e.g. at TDC or after TDC).

During a subsequent cycle or cycles, shown as the SI/HCCI transition region, the EVO and the EVC may be controlled to remain substantially unchanged, while the IVO and IVC may be retarded by the EVA system. The example of FIG. 4 shows the IVO retard being greater than the IVC retard; however, the IVO and IVC may be adjusted with the same retard. In this manner, the intake and exhaust valves may have a negative valve overlap. Further, the spark timing during the SI/HCCI transition region may be retarded to control torque fluctuations and/or provide increased cylinder heating that may be recirculated back to the cylinder by an EGR system and/or gas trapping. During the SI/HCCI transition region, spark timing may be retarded over one or more cycles prior to further increasing the negative overlap between the intake and exhaust valves. As one example, the time or number of cycles before the switch in overlap is performed and HCCI mode is initiated may be a function of the number of cycles where the spark event is at a retarded timing. For example, the spark timing may be retarded over one, two, three, or more cycles before HCCI mode is performed and valve overlap is further increased. The number of cycles performed with retarded ignition timing before the valve overlap is further increased may be based on at least one of air charge temperature, engine coolant temperature and fuel volatility, or other operating conditions. In yet another example, the time or number of cycles before the switch in overlap is performed may be a function of the level of spark retard used during the transition. For example, as the spark retard is increased, the number of cycles of retarded spark timing before the transition to HCCI and the increased valve overlap may decrease.

At a subsequent cycle, shown as the HCCI mode operating region, the EVO may be controlled to remain the same, while the EVC may be rescheduled by the control system to an advanced timing, thereby increasing the negative valve overlap. Further, the IVO and IVC may be controlled to remain at the same timing. During HCCI operation, the use of a spark to initiate combustion may be discontinued or may be used as necessary to ensure that autoignition has occurred at the desired combustion timing. In this manner, operating conditions such as valve timing and/or spark timing may be controlled during transitions from SI mode to HCCI mode so that repeatability and robustness of the transitions may be improved.

Note that the example control and estimation routines included herein can be used with various engine configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 48 of the engine control system.

It will be appreciated that the configurations and routines disclosed herein are exemplary in nature, and that these specific embodiments are not to be considered in a limiting sense, because numerous variations are possible. For example, the above technology can be applied to V-6, V-8, I-4, I-6, V-10, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method of transitioning a cylinder of an engine from a spark ignition mode to a homogeneous charge compression ignition mode, comprising:

before a transition, operating the cylinder with at least some overlap between an opening event of an intake valve and a closing event of an exhaust valve in the spark ignition mode;

in response to a transition request, operating the cylinder with at least some negative overlap between the opening event of the intake valve and the closing event of the exhaust valve, retarding the opening event and a closing event of the intake valve, the opening event retarded a different amount than the closing event and retarding ignition timing; and further increasing negative overlap and performing the homogeneous charge compression ignition mode.

2. The method of claim 1, wherein said retarded ignition timing is performed over a predetermined number of cycles prior to said further increasing negative overlap.

3. The method of claim 2, wherein the predetermined number of cycles is at least two cycles.

4. The method of claim 2, wherein the predetermined number of cycles is based on at least one of air charge temperature, engine coolant temperature and fuel volatility.

5. The method of claim 1, wherein the opening timing of the intake valve is retarded by a greater amount than the closing timing of the intake valve in response to the transition request.

6. The method of claim 1 further comprising, after the transition to the homogeneous charge compression ignition mode, advancing a timing of the closing event of the exhaust valve more than an opening timing of the exhaust valve.

7. The method of claim 6, wherein said exhaust valve and said intake valve are electrically actuated.

8. The method of claim 1, wherein said ignition timing is retarded during the transition and wherein an amount of said ignition timing retard is based on at least one of an amount of intake valve opening timing retard and an amount of intake valve closing timing retard.

9. The method of claim 1 further comprising, reducing a frequency of an ignition spark performed within the cylinder after the transition to the homogeneous charge compression ignition mode.

10. The method of claim 1, wherein after the transition to the homogeneous charge compression ignition mode, the intake valve opening timing is after a top dead center position of an intake stroke and the closing event of the exhaust valve is before the top dead center position of the intake stroke.

11. A method of transitioning a cylinder of an engine from a spark ignition mode to a homogeneous charge compression ignition mode, the cylinder having at least one intake valve and at least one exhaust valve, the method comprising:

in response to a combustion mode transition request, retarding an opening timing of the at least one intake valve by a first amount and retarding a closing timing of the at least one intake valve by a second amount less than said first amount so that a duration of an intake valve opening is decreased; and subsequently advancing a closing event of the at least one exhaust valve so that a duration of an exhaust valve opening is decreased.

12. The method of claim 11, wherein said advancing a closing event of the at least one exhaust valve is performed after the transition to the homogeneous charge compression ignition mode is performed and in response to the combustion mode transition request.

13. The method of claim 11, wherein said retarding the opening timing of the at least one intake valve includes opening the at least one intake valve after top dead center of an intake stroke.

14. The method of claim 11, wherein the at least one intake valve is opened and closed by an electric valve actuator.

15. The method of claim 11 further comprising, retarding an ignition timing of the cylinder in response to said transition request before said advancing a closing event of the at least one exhaust valve.

16. The method of claim 11 further comprising, varying an ignition timing of the cylinder in response to the combustion mode transition request, wherein the ignition timing is further retarded as the opening timing of the at least one intake valve is further retarded.

17. The method of claim 11, wherein the spark ignition mode is a substantially homogeneous spark ignition mode.

18. An engine system for a vehicle, comprising:
a cylinder;
an intake valve for controlling airflow to the cylinder;
an exhaust valve for controlling airflow from the cylinder;
a first electric valve actuator for controlling at least an opening and a closing of the intake valve; and
a control system for transitioning the cylinder from a spark ignition mode to a homogeneous charge compression ignition mode; where before a transition from the spark ignition mode to the homogeneous charge compression ignition mode, the control system operates the cylinder in the spark ignition mode with overlap between an open position of the intake valve and the exhaust valve, and in response to a transition request, the control system retards at least an intake valve opening and closing timing via the first electric valve actuator; and after the transition, the control system operates the cylinder with negative overlap between an open position of the intake valve timing and the exhaust valve.

19. The engine system of claim 18, wherein the control system further retards a spark timing based on an amount that the intake valve timing is retarded and wherein the control system advances an exhaust valve timing after the spark timing is retarded for at least one cycle.

20. The engine system of claim 18, wherein the control system operates the intake valve and the exhaust valve in an open position during the overlap, and operates the intake valve and the exhaust valve in a closed position during the negative overlap.

* * * * *